United States Patent
Lin et al.

(10) Patent No.: US 9,488,726 B2
(45) Date of Patent: Nov. 8, 2016

(54) OBJECT DETECTION METHOD USING ULTRASONIC WAVES AND OBJECT DETECTION APPARATUS

(71) Applicant: PEGATRON CORPORATION, Taipei (TW)

(72) Inventors: Yu-Chung Lin, Taipei (TW); Jing-Rung Wang, Taipei (TW); Min-Shao Hsieh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 597 days.

(21) Appl. No.: 14/024,753

(22) Filed: Sep. 12, 2013

(65) Prior Publication Data
US 2014/0086015 A1    Mar. 27, 2014

(30) Foreign Application Priority Data
Sep. 24, 2012 (TW) .............. 101134981 A (51) Int. Cl.
| | | |
|---|---|---|
| *G01S 15/00* | (2006.01) | |
| *G01S 15/52* | (2006.01) | |
| *G01S 15/08* | (2006.01) | |
| *G01S 15/04* | (2006.01) | |

(52) U.S. Cl.
CPC .............. *G01S 15/52* (2013.01); *G01S 15/04* (2013.01); *G01S 15/08* (2013.01); *G01S 15/523* (2013.01); *G01S 15/526* (2013.01)

(58) Field of Classification Search
None
See application file for complete search history.

(56) References Cited

U.S. PATENT DOCUMENTS

| | | | |
|---|---|---|---|
| 4,225,858 A | * | 9/1980 | Cole .................. G08B 13/1627 340/554 |
| 4,991,146 A | | 2/1991 | Ransdell et al. |
| 6,331,964 B1 | | 12/2001 | Barone |

FOREIGN PATENT DOCUMENTS

| | | |
|---|---|---|
| TW | 220218 U | 2/1994 |
| TW | I280404 B | 5/2007 |
| WO | 99/40453 | 8/1999 |

OTHER PUBLICATIONS

English translation of abstract of TW I280404 (published May 1, 2007).
English translation of abstract of TW 220218 (published Feb. 1, 1994).
European Patent Office Search Report dated May 9, 2014.

* cited by examiner

*Primary Examiner* — James Hulka
*Assistant Examiner* — Jonathan Armstrong
(74) *Attorney, Agent, or Firm* — McClure, Qualey & Rodack, LLP (57) ABSTRACT

An object detection method using ultrasonic waves includes: emitting a plurality of ultrasonic signals sequentially according to a time interval; sensing a sound wave formed by each of the ultrasonic signals to generate a reflected signal; and analyzing the reflected signal to detect at least one reflection object. It can be clearly known whether a reflection object is appearing, moving and the moving direction by the method.

8 Claims, 8 Drawing Sheets

OBJECT DETECTION METHOD USING ULTRASONIC WAVES AND OBJECT DETECTION APPARATUS

CROSS-REFERENCES TO RELATED APPLICATIONS

This non-provisional application claims priority under 35 U.S.C. §119(a) on Patent Application No. 101134981 filed in Taiwan, R.O.C. on Sep. 24, 2012, the entire contents of which are hereby incorporated by reference.

BACKGROUND

Field of Invention

The invention relates to an object detection method for power management and, in particular, to an object detecting method using ultrasonic waves and an object detection apparatus.

Related Art

Along with the development and maturity of electronic technology, various electronic appliances, such as televisions, air conditioners and microwave ovens, have become closely tied to human lives. Generally, it is user's habit to keep those electronic appliances in a standby condition or to leave their plugs remain plugged even when those appliances are not in use. Such habit results in unnecessary power consumptions. Even the power consumptions of electronic appliances when not in use are not much, for example, a standby television consumes about 6 to 15 watts, a standby microwave oven consumes about 0.1 to 4.2 watts, and a standby stereo consumes about 0.04 to 14.9 watts, the accumulated power consumptions of those appliances are still considerable. It is estimated that each household may thus consume additional 300 kWh per year. Not only the power is wasted, but also the electricity cost is increased. This contradicts to the current trend of energy saving.

Along with the development of smart home appliances, user detection technology has been adopted when designing home appliances to let the home appliances enter into a power saving mode when not in use. Current user detection technology uses an infrared ray sensor or an image processing and detecting technique. The infrared ray sensor senses the move of a user by sensing the temperature variations within a sensed range (the variation of the infrared ray) when the user enters or leaves the sensed range. The image processing and detecting technique performs a determination based on the images taken within a continuous time period. When the user moves within an image-taking range, the images taken would be different along with the move of the user. The user's move can be analyzed by comparing the multiple images taken during the continuous time period.

However, although the infrared ray sensor can be used to determine the move of the user, the distance between the user and the infrared ray sensor within the sensed range cannot be determined based on the variation of the infrared ray.

The image processing and detecting technique requires the process of huge amount of image data input and algorithm analyses to determine the move of the user, which results in higher costs to build hardware and software. The image processing and detecting technique of a higher level can even analyze the distance to the user, but it requires hardware and software of a higher level.

SUMMARY OF THE INVENTION

In some embodiments, the object detection method using ultrasonic waves include: emitting a plurality of ultrasonic signals sequentially according to a time interval, sensing a sound wave formed by each of the ultrasonic signals to generate a reflected signal, and analyzing the reflected signal to detect at least one reflection object.

The analyzing step of each reflected signal includes: sampling the reflected signal to generate a plurality of sample values, and form a real-time environment array having the sample values corresponding to a plurality of indices, comparing, according to the indices, the sample values in the real-time environment array with a plurality of corresponding environment elements in a cumulative environment array to generate an object appearance array having a plurality of first markers, selectively cumulating a plurality of corresponding cumulative values in a continuous appearance array, and updating corresponding second markers in a moving object array to respond to the change of the cumulative values in the continuous appearance array. Here, each environment element is one of the sample values corresponding to the same index in the real-time environment arrays obtained from previous analyzing steps. These first markers correspond to the indices, respectively, and each first marker corresponds to the comparison result of the sample value and the environment element corresponding to the same index.

In some embodiments, an object detection apparatus include: an ultrasonic sensor, a driving circuit, and a microcontroller.

The ultrasonic sensor is for emitting a plurality of ultrasonic signals sequentially, and sensing a sound wave formed by each of the ultrasonic signals to generate a reflected signal after each time the ultrasonic signal is emitted. The driving circuit is for driving the ultrasonic sensor. The microcontroller is for analyzing each reflected signal to detect at least one reflection object.

The analyzing step of the reflected signal includes: sampling the reflected signal to generate a real-time environment array, comparing the real-time environment array with a cumulative environment array to generate an object appearance array, updating a continuous appearance array according to the object appearance array, and updating a moving object array according to the change of the continuous appearance array.

Here the real-time environment array has a plurality of indices and a plurality of sample values, and these sample values correspond to these indices, respectively. The cumulative environment array responds to the previous real-time environment arrays. The object appearance array has a plurality of first markers corresponding to the indices, respectively. The continuous appearance array has a plurality of cumulative values corresponding to the indices, respectively. The moving object array has a plurality of second markers corresponding to the indices, respectively.

In the object detection method using ultrasonic waves and the object detection apparatus according to the embodiments of the invention, it can be clearly known if any user (reflection object) appears through the object appearance array and the continuous appearance array. Through the moving object array, it can be clearly known if the user is moving and the moving direction. The information of whether the user appears, whether the user is moving, the moving direction, and the distance to the user can be transmitted to the power management module of the electronic appliance to enable the power management module to switch to corresponding power modes to achieve the objective of power saving.

DETAILED DESCRIPTION OF THE INVENTION

The present invention will be apparent from the following detailed description, which proceeds with reference to the accompanying drawings, wherein the same references relate to the same elements.

Figure 1:
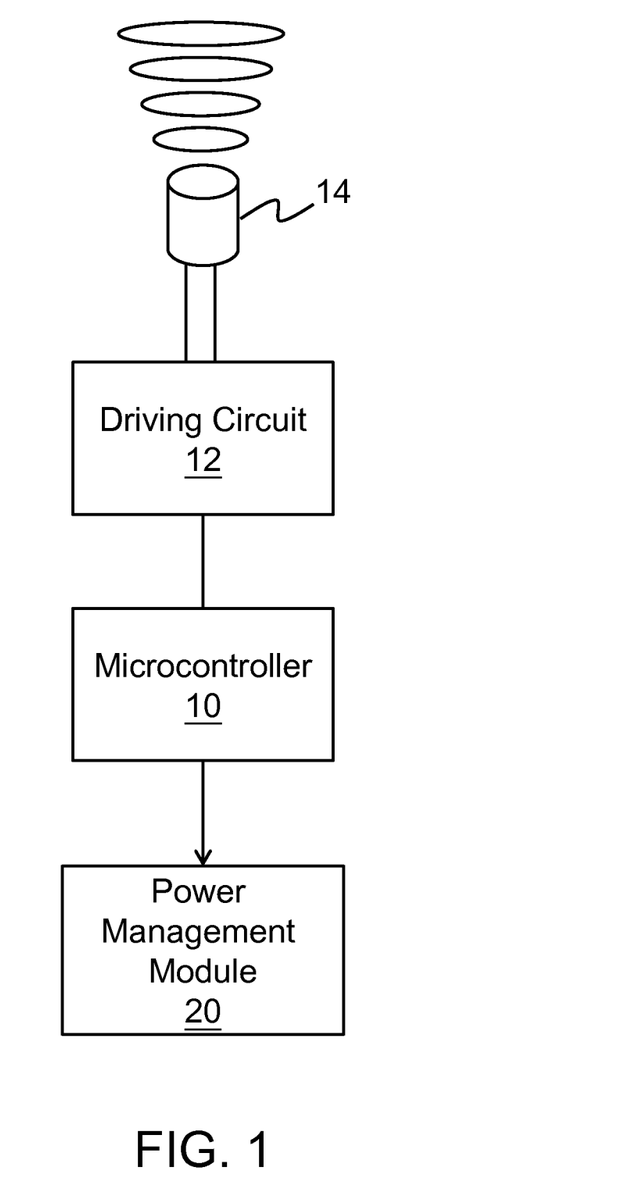
FIG. 1 is a schematic diagram of the object detection apparatus according to an embodiment of the invention.

Referring to FIG. 1, the object detection method using ultrasonic waves according to the invention may be implemented via a microcontroller 10 executing a firmware or software algorithm.

Figure 2:
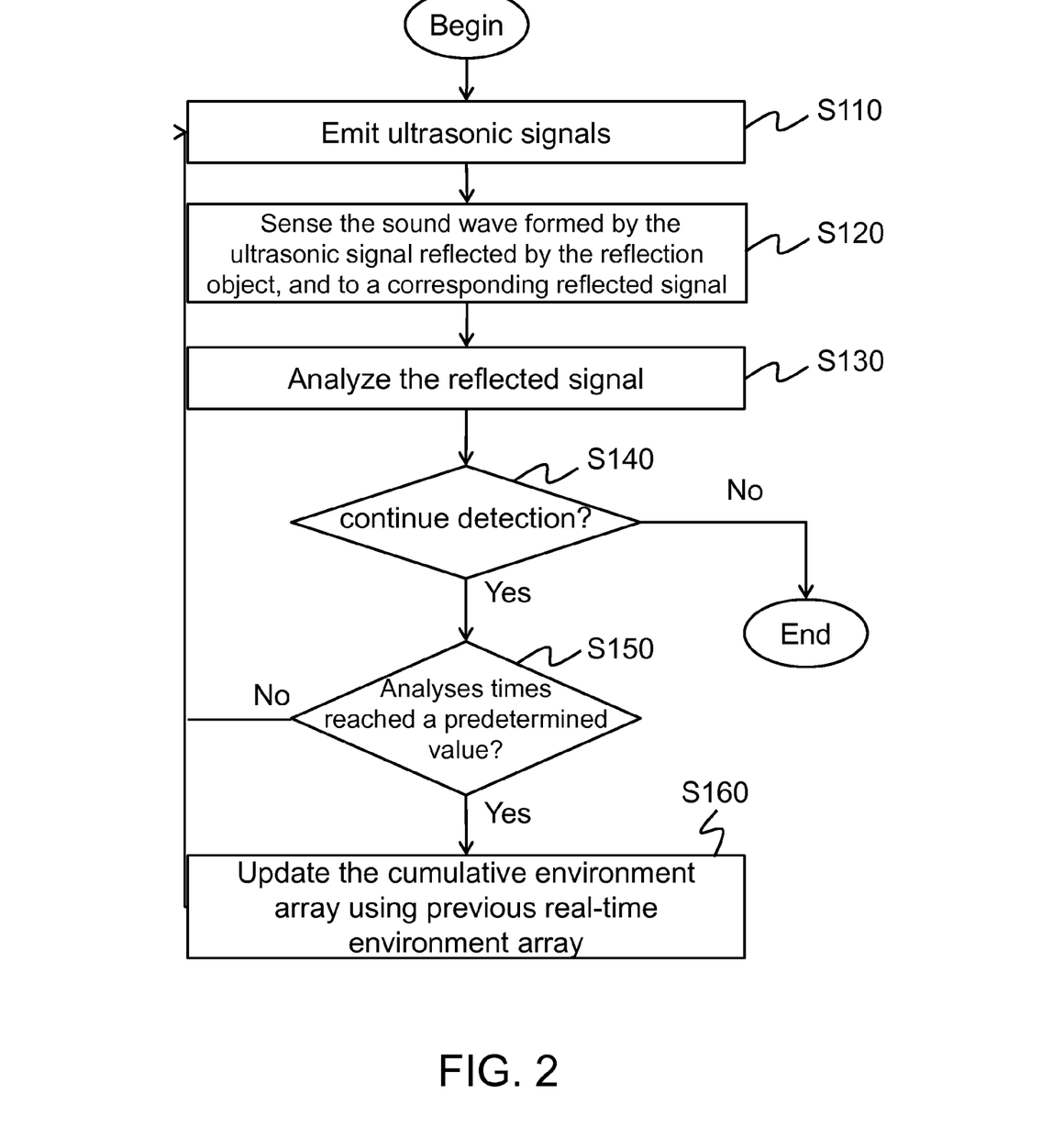
FIG. 2 is a flowchart of the object detection method using ultrasonic waves according to an embodiment of the invention.

Referring to FIG. 2, in an embodiment, the microcontroller 10 enables a driving circuit 12 to drive an ultrasonic transducer 14 (referred to hereinafter as a sensor), so that the ultrasonic sensor 14 sequentially emits a plurality of ultrasonic signals according to a time interval (S110).

Each time the ultrasonic signal is emitted, the ultrasonic sensor 14 senses the sound wave formed by the ultrasonic signal reflected by the reflection object, and converts the sensed reflected sound wave to a corresponding reflected signal (S120). For example, after the ultrasonic sensor 14 emits a first ultrasonic signal (S110), the ultrasonic sensor 14 senses the reflected sound wave to generate a reflected signal corresponding to the first ultrasonic signal (S120). Afterwards, the microcontroller 10 receives the reflected signal to perform an analysis to the reflected signal to detect whether a moving behavior of the reflection object exists within the sensing range of the ultrasonic sensor 14 (S130).

If continued detection is needed (S140), the ultrasonic sensor 14 emits a second ultrasonic signal (S110), and senses the reflected sound wave to generate a reflected signal corresponding to the second ultrasonic signal (S120), and so on. Here, the time interval for emitting sound waves corresponds to the sensing range of the ultrasonic sensor 14. For example, when the sensing range of the ultrasonic sensor 14 is the shortest distance of 2 meters from the ultrasonic sensor 14, the time interval for emitting sound waves may be 11.6 ms (i.e., 2*(shortest distance)/(the speed of sound)).

Figure 3:
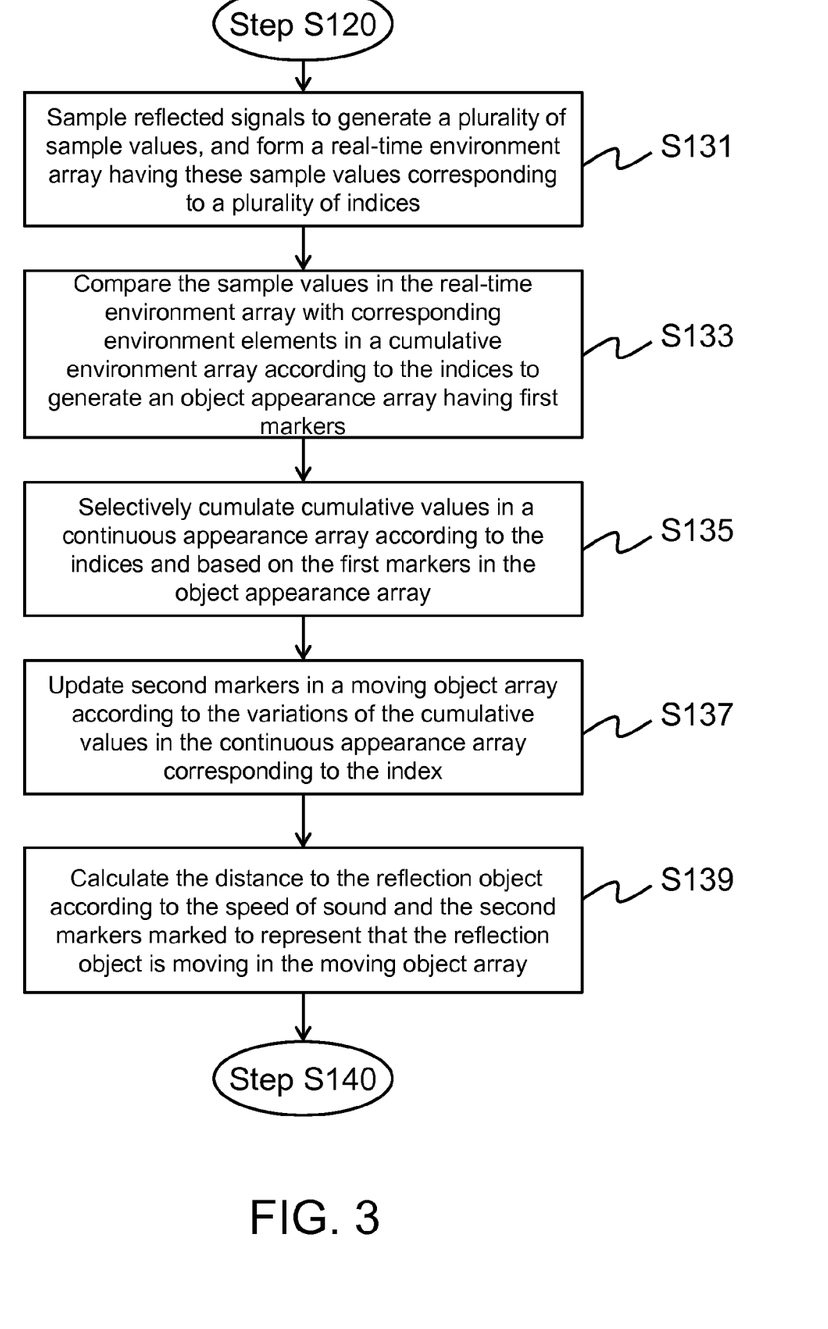
FIG. 3 is a flowchart of step S130 in an embodiment.

Referring to FIG. 3, in the step S130 of analyzing each reflected signal, first, the received reflected signals are sampled to generate a plurality of sample values, and a real-time environment array having these sample values corresponding to a plurality of indices is formed (S131). In the real-time environment array, the generated sample values are sorted according to the sampling time and assigned with corresponding indices. In other words, the real-time environment array is a record of the amplitude intensities of the reflected ultrasonic signals (i.e., the reflected signals) in the sensing environment. The sample values are values obtained by time-sequentially sampling the amplitude voltage of the reflected signals. Therefore, these indices may represent the time sequence of these sample values, and the time axis of the reflected signals corresponds to the sensed distance of the reflection object, that is, the distance between the reflection position of the ultrasonic signal and the ultrasonic sensor 14. In other words, each index may represent a sensed distance. Initially, before the ultrasonic sensor 14 starts sensing, all sample values in the real-time environment array are zero.

The sample values in the real-time environment array are sequentially compared with corresponding environment elements in a cumulative environment array according to the indices to generate an object appearance array (S133).

The environment elements in the cumulative environment array correspond to the indices, respectively. The cumulative environment array corresponds to the multiple real-time environment arrays previously mentioned. The cumulative environment array is a historical record of multiple sequential real-time environment arrays, and can be treated as the historical record of amplitude intensities of the reflected ultrasonic signals while sensing the environment. In other words, in the cumulative environment array, each environment element is one of the sample values corresponding to the same index in the multiple real-time environment arrays obtained by the previous analyzing step. In some embodiments, in the cumulative environment array, each environment element is the maximum value of the sample values corresponding to the same index in the multiple sequential real-time environment arrays, that is, the historical sample value which has the maximum amplitude intensity. Initially, all environment elements in the cumulative environment array are 0.

The object appearance array also has a plurality of first markers, and these first markers correspond to the indices, respectively. The object appearance array is the result of comparing the real-time environment array with the cumulative environment array, and can be used to determine whether any object (such as a human body) entered the sensing area. In other words, each first marker corresponds to the result of comparing the sample value with the environment element corresponding to the same index. In some embodiments, each first marker can be marked as 0 or 1 based on the comparison result of the sample value and the environment element corresponding to the same index. In some embodiments, the mark "0" means that the value of the sample value is smaller than the value of the environment element corresponding to the same index, which means that no object entered the corresponding sensing range (no object appeared). The mark "1" means that the value of the sample value is not smaller than the value of the environment element corresponding to the same index, which means that an object entered the corresponding sensing range (an object appeared). Initially, all first markers in the object appearance array are set to be 0.

Afterwards, cumulative values in a continuous appearance array are selectively cumulated according to the indices and based on the first markers in the object appearance array (S135). The continuous appearance array has a plurality of cumulative values, and these cumulative values correspond to the indices, respectively. The continuous appearance array is an accumulation of the object appearance array, which can be treated as the cumulative times of the object being continuously sensed at a specific sensing distance. In some embodiments, the cumulative values are arbitrary integers from 0 to 100, which represents the cumulative times being sensed at the corresponding sensing distance. Initially, all cumulative values are set to be 0. When the first marker representing the appearance of the reflection object appears, the corresponding cumulative value is incremented by 1. To the contrary, when the first marker representing that the reflection object does not appear, the corresponding cumulative value is decremented by 1.

Then, second markers in a moving object array are updated according to the variations of the cumulative values in the continuous appearance array corresponding to the index (S137). The moving object array has a plurality of second markers, and these second markers correspond to the indices, respectively. The moving object array determines the moving or stationary state of the object at a corresponding sensing distance according to each of the cumulative values in the continuous appearance array, which can be treated as whether a moving object is sensed at a specific sensing distance. In some embodiments, the moving object array is constituted of first values and second values. In some embodiments, the mark "first value" means that a moving objects exists at the sensing distance corresponding to the index. To the contrary, the mark "second value" means that there is no moving object. Initially, all the second markers in the moving object array are set to be the second value. In some embodiments, the first value and the second value are "1" and "0", respectively. That is, the second markers are either 0 or 1.

Array elements in various arrays (i.e., the sample values, the environment elements, the first markers, the cumulative values, and the second markers) correspond to all indices in the same set. That is, the number of the indices is the same to the numbers of the sample values, the environment elements, the first markers, the cumulative values and the second markers in various arrays. Furthermore, the same index correspond to one sample values, one environment element, one first marker, one cumulative value and one second marker. Here, each index may represent the corresponding relationship of the elements in various arrays.

Lastly, the distance to the reflection object is calculated according to the speed of sound and the second markers marked to represent that the reflection object is moving in the moving object array (S139). Here, the reflection object may be a user.

Figure 4:
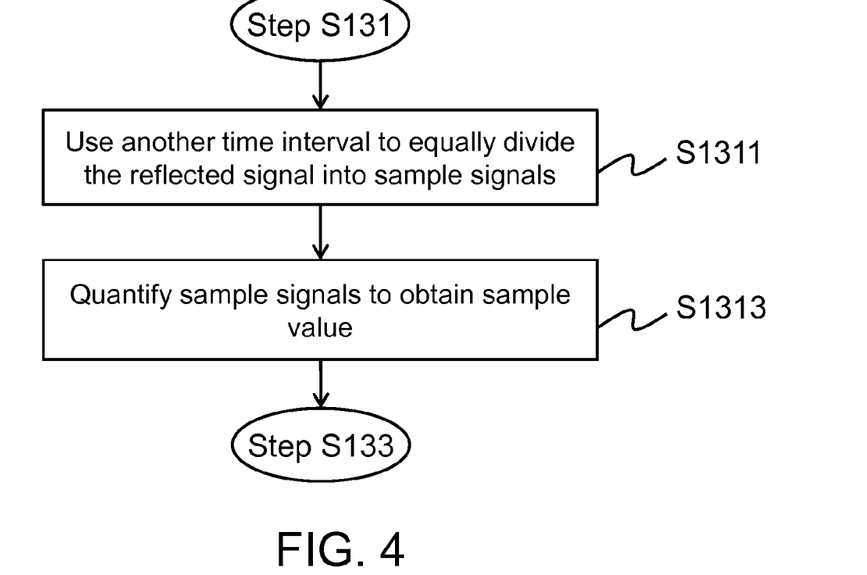
FIG. 4 is a flowchart of step S131 in an embodiment.
Figure 5:
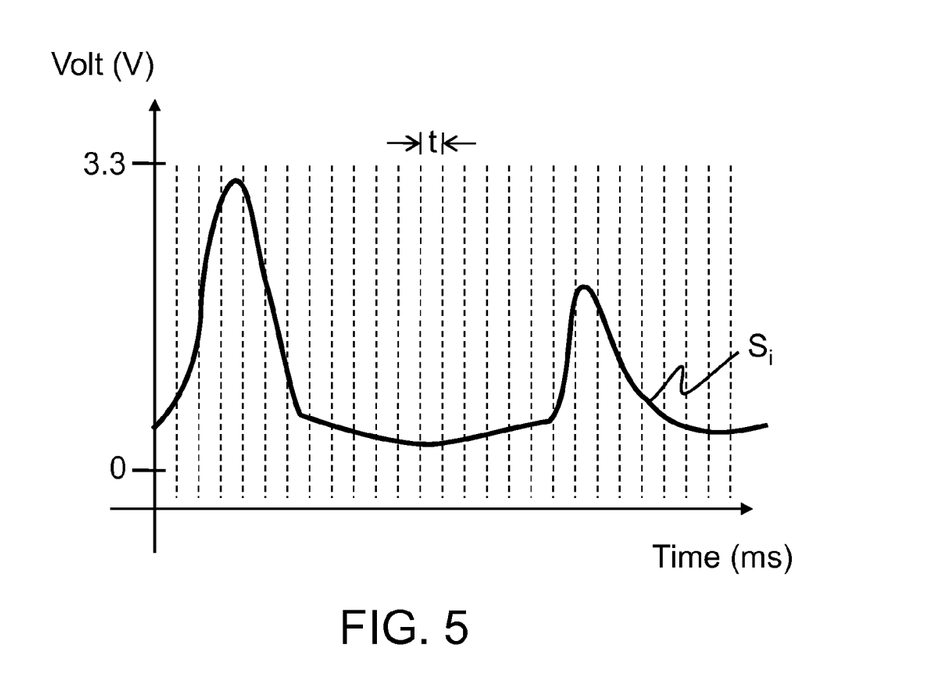
FIG. 5 is a waveform diagram of the reflected signal in an embodiment.

In some embodiments, referring to FIG. 4, in step S131, the received reflected signal may be used to generate a plurality of sample signals based on another time interval (step S1311), and those sample signals may be quantified to obtain sample values (step S1313). For example, the ultrasonic sensor 14 detects reflected signals $S_i$ within a continuous time period as shown in FIG. 5, wherein i means the number of time for the ultrasonic sensor 14 to perform the detection. In this embodiment, the ultrasonic signal emitted by the ultrasonic sensor 14 is 3.3V and 40 kHz (kilo hertz), and is lasted for 0.2 ms (milliseconds). Referring to FIG. 4 and FIG. 5, the reflected signal $S_i$ is evenly divided into N sample signals by the time interval t (step S1311), and each sample signal is quantified to obtain the sample value sequentially corresponding to each index according to time sequence (step S1313), which is shown in Table 1.

TABLE 1

| | index | | | | | | | | | | |
|---|---|---|---|---|---|---|---|---|---|---|---|
| | $1^{st}$ | $2^{nd}$ | $3^{rd}$ | $4^{th}$ | $5^{th}$ | $6^{th}$ | $7^{th}$ | $8^{th}$ | $9^{th}$ | ... | $(N-1)^{th}$ | $N^{th}$ |
| sample value | 3.06 | 3.13 | 3.22 | 3.17 | 3.1 | 2.84 | 2.77 | 2.72 | 2.69 | ... | 2.22 | 2.25 |
| environment element | 3.1 | 3.09 | 3.24 | 3.2 | 3.15 | 2.97 | 2.62 | 2.57 | 2.71 | ... | 2.31 | 2.41 |
| first marker before filtering | 0 | 1 | 0 | 0 | 0 | 0 | 1 | 1 | 0 | ... | 0 | 0 |
| first marker after filtering | 0 | 0 | 0 | 0 | 0 | 0 | 1 | 1 | 0 | ... | 0 | 0 |
| cumulative value before update | 0 | 0 | 0 | 0 | 0 | 0 | 0 | 30 | 35 | ... | 0 | 0 |
| cumulative value after update | 0 | 0 | 0 | 0 | 0 | 0 | 1 | 31 | 34 | ... | 0 | 0 |
| second marker before update | 0 | 0 | 0 | 0 | 0 | 0 | 0 | 1 | 1 | ... | 0 | 0 |
| second marker after update | 0 | 0 | 0 | 0 | 0 | 0 | 1 | 1 | 1 | ... | 0 | 0 |

Here, t is larger than 0 and is smaller than the time interval between two sonic wave emissions, that is, the emission period of the sound wave. N is the sample times, which is the emission period of the sound wave divided by t. In some embodiments, N may be a positive integer larger than 20, such as 24.

Figure 6:
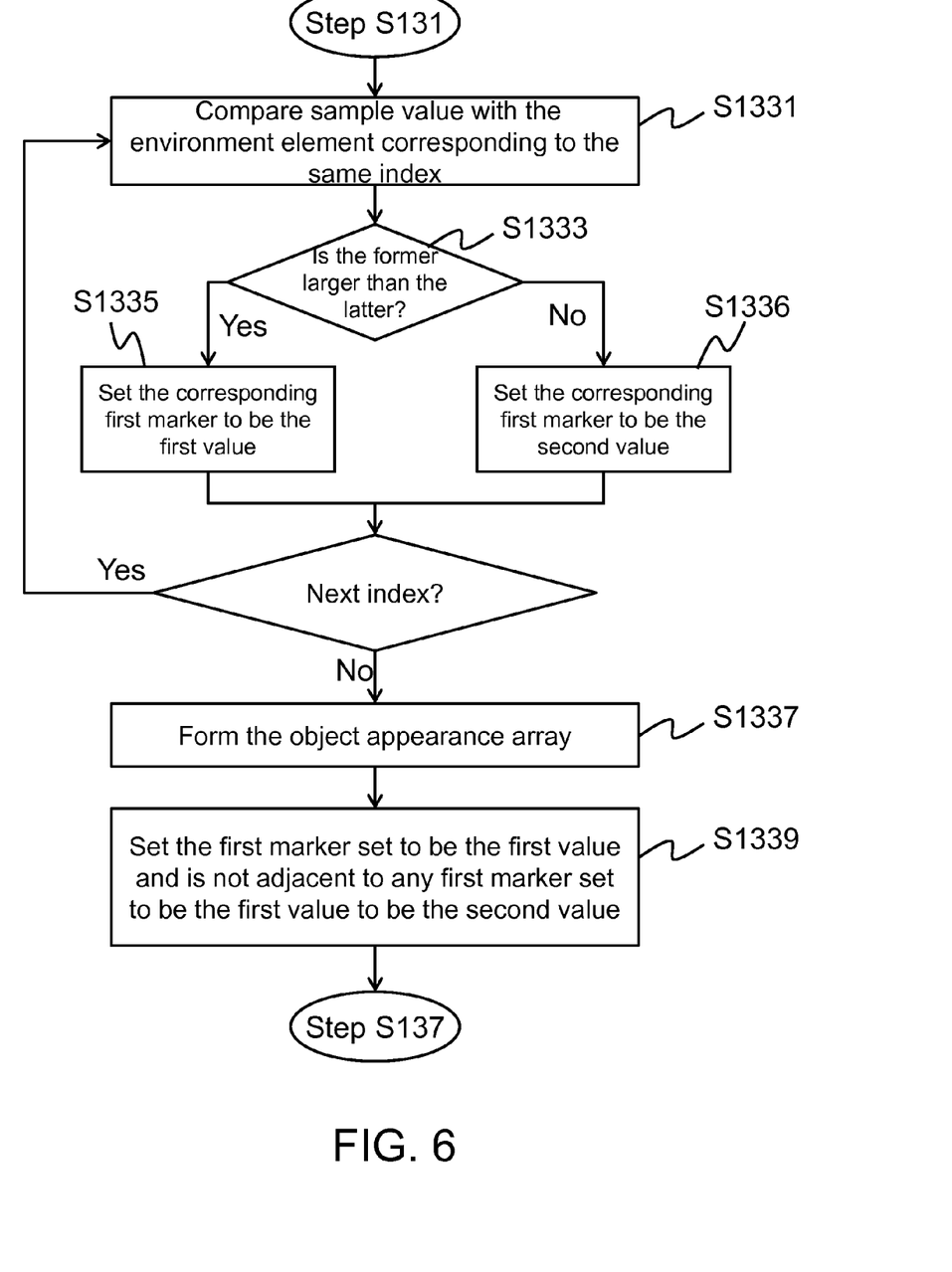
FIG. 6 is a flowchart of step S133 in an embodiment.

In some embodiments, referring to FIG. 6, in step S133, each sample value is compared with the environment element corresponding to the same index (S1331). Then, an object appearance array is generated according to the comparison result of the sample values and the corresponding environment elements (S1337). When the sample value is larger than the corresponding environment element (S1333), the corresponding first marker is set to be the first value representing the appearance of the reflection object (S1335). When the sample value is smaller than or equal to the corresponding environment element (S1333), the corresponding first marker is set to be the second value representing that the reflection object does not appear (S1336). In some embodiments, the comparisons and the settings of the corresponding first markers are performed repeatedly and sequentially according to the sequence of the indices until all the comparisons of the elements corresponding to the indices and the settings of the first markers to form the object appearance array (S1337).

Take the Table 1 as an example, after comparing the sample value with the environment element of the $1^{st}$ index, it is obtained that the sample value is smaller than the environment element. Here, the first marker corresponding the $1^{st}$ index is set to be 0 (i.e., the second value) to represent that the reflection object does not appear.

After comparing the sample value with the environment element of the $2^{nd}$ index, it is obtained that the sample value is larger than the environment element. Here, the first marker corresponding to the $2^{nd}$ index is set to be 1 (i.e., the first value) to represent the appearance of the reflection object, and so on.

In some embodiments, after obtaining the object appearance array by comparing sample values with the environment elements (S1337), a noise filtering step (S1339) is performed. In the sensing environment, if the interference of the noise to the reflected sound wave intensifies the reflected signal, the sample value will be larger than the environment element which results in the false setting of the first marker in the object appearance array to be the first value. The noise filtering step assumes that a moving object in a real sensing environment should make multiple adjacent first markers in the object appearance array be set as the first value, and a standalone first marker set to be the first value should be filtered as noise. In step S1339, the first marker set to be the first value and is not adjacent to any first marker set to be the first value is set to be the second value in the object appearance array according to the corresponding index. That is, based on the sequence of the indices, all first markers set to be the first value and are not adjacent to any first marker set to be the first value are re-set to be the second value.

In other words, when performing the noise filtering step, each first marker representing the reflection object is confirmed to see whether an adjacent same marker exists. If no, the large amount of the corresponding sample value should be the effect of the noise. When this happens, the first marker is re-set to be the second value to represent that no reflection object appears. If yes, the marker is remained to be the first value.

Take Table 1 as an example. The first marker corresponding to the $2^{nd}$ index has no adjacent first marker set to be the first value. Therefore, it is re-set to be the second value. That is, the adjacent first markers of the first marker corresponding to the $2^{nd}$ index are the first markers corresponding to the $1^{st}$ index and the $3^{rd}$ index. Since the first markers corresponding to the $1^{st}$ index and the $3^{rd}$ index are both set to be the second value, the first marker corresponding to the $2^{nd}$ index is re-set to be the second value. The first markers corresponding to the $7^{th}$ and the $8^{th}$ indices are both set to be the first value. Therefore, they remain unchanged.

Figure 7:
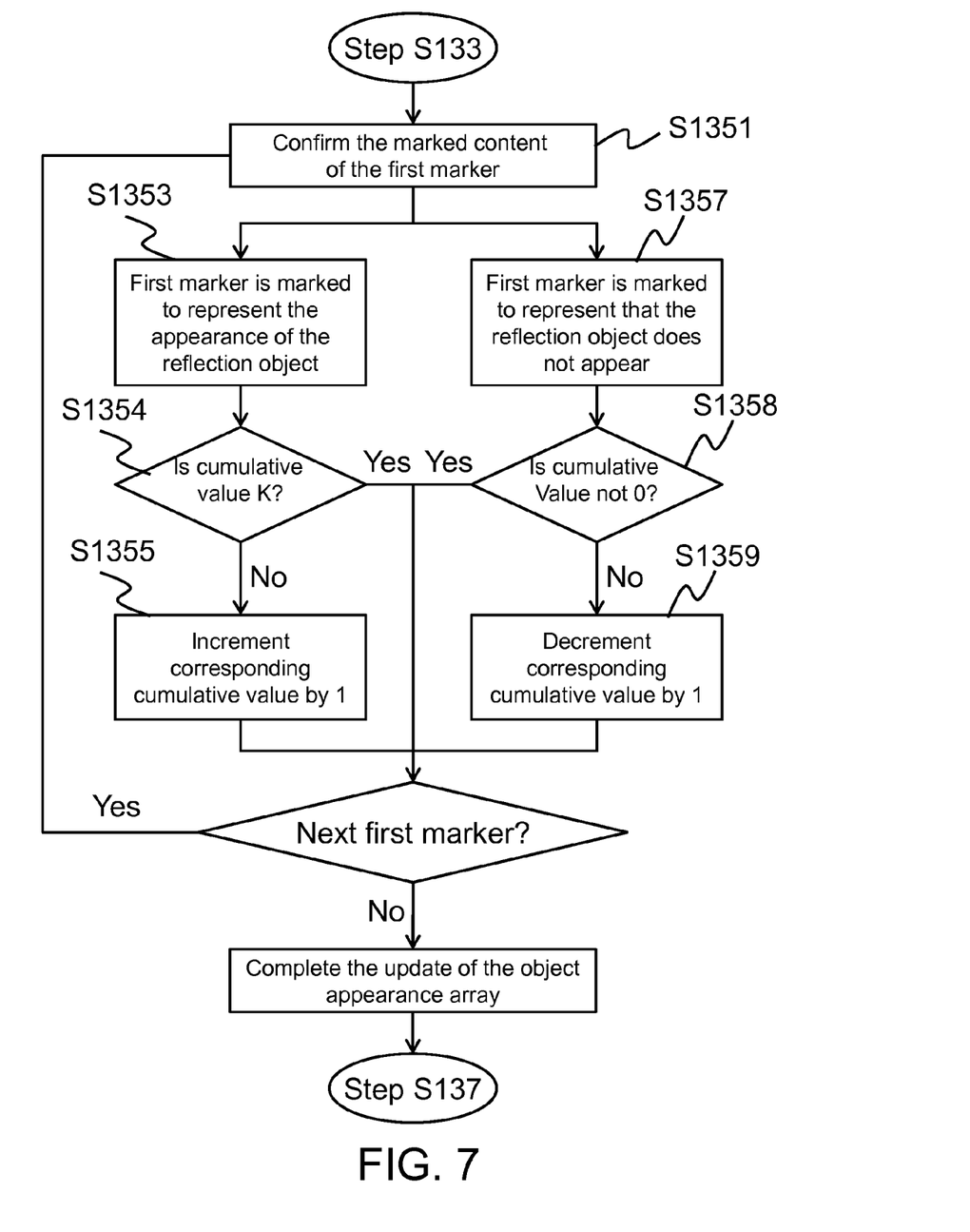
FIG. 7 is a flowchart of step S135 in an embodiment.

In some embodiments, referring to FIG. 7, in step S135, whether the cumulative value of the same index should be cumulated is decided by confirming the marked content of the first marker (S1351). When the first marker in the moving object array is marked to represent the appearance of the reflection object (step S1353), the cumulative value corresponding to the same index is incremented by 1 (step S1355). To the contrary, when the first marker in the moving object array is marked to represent that the reflection object does not appear (step S1357), the cumulative value corresponding to the same index is decremented by 1 (step S1359). Here, the cumulative value is an integer between 0 to K. That is, when the cumulative value is already 0 (step S1358), it will not be decremented by 1 even when the first marker is marked to represent that the reflection object does not appear. Similarly, when the cumulative value is already K (step S1354), the cumulative value will not be incremented by 1 even when the first marker is marked to represent that the appearance of the reflection object. Here, K is the maximum cumulative number of the periods of the continuous appearance of the reflection object (i.e., the first marker is continuously marked to represent the appearance of the reflection object). When the cumulative value is K, the reflection object has been continuously appeared for K periods of sound wave emissions. In some embodiments, K is an integer of two digits or three digits, and is preferred to be 100 without limiting sense.

Figure 8:
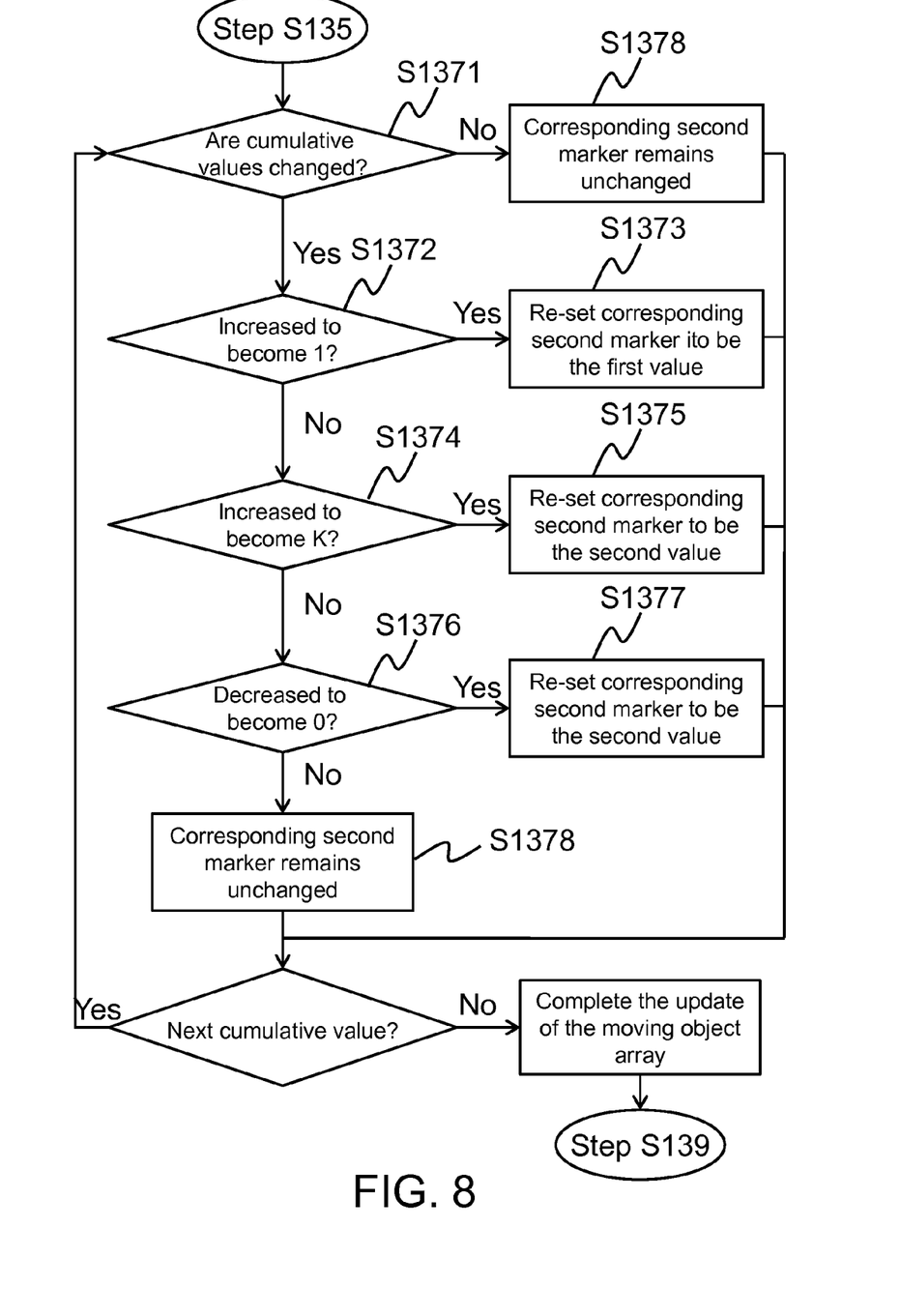
FIG. 8 is a flowchart of step S137 in an embodiment.

In some embodiments, referring to FIG. 8, in step S137, the second marker is set to be the second value initially as an example. The cumulative values are checked to see if any changes (step S1371). When the cumulative value is increased to become 1 (step 1372), the corresponding second marker is re-set to be the first value (step 1373) to represent that the reflection object is moving. When the cumulative value is increased to become K (step S1374), the corresponding second marker is re-set to be the second value (step S1375) to represent that the moving reflection object is no longer moving. When the cumulative value is decreased to become 0 (step S1376), the corresponding second marker is re-set to be the second value (step S1377) to represent that no reflection object exists or the reflection object has left. When the cumulative value remains unchanged or does not fall within the three conditions mentioned above, the corresponding second marker remains unchanged (step S1378).

Take Table 1 as an example, the first markers corresponding to the $7^{th}$ index and the $8^{th}$ index are set to be 1 (representing the appearance of the reflection object). Therefore, the cumulative values corresponding to the $7^{th}$ index and the $8^{th}$ index are incremented by 1. Since the cumulative values corresponding to other indices (the $1^{st}$ to $6^{th}$ and the $9^{th}$ to $N^{th}$ indices) are 0, the cumulative values remain to be 0 and do not need to be decremented by 1 even the corresponding first markers are 0 (representing that the reflection object does not appear). That is, the cumulative value corresponding to the $7^{th}$ index is changed from 0 to 1, the cumulative value corresponding to the $8^{th}$ index is changed from 30 to 31, and the cumulative values corresponding to other indices remain to be 0.

Furthermore, since the cumulative value corresponding to the $7^{th}$ index is re-set from 0 to 1, the second marker corresponding to the $7^{th}$ index is re-set from "0" (i.e., the second value) to "1" (i.e., the first value).

Take Table 2 as an example, where the cumulative values are integers between 0 and 100. Since the first markers corresponding to the $7^{th}$ index and the $8^{th}$ index are 1 (representing the appearance of the reflection object), the cumulative values corresponding to the $7^{th}$ index and the $8^{th}$ index are incremented by 1. Since the first markers corresponding to the $5^{th}$ index and the $6^{th}$ index are 0 (representing that the reflection object does not appear), the cumulative values corresponding to the $5^{th}$ index and the $6^{th}$ index are decremented by 1. Since the cumulative value corresponding to the $9^{th}$ index is 100, it remains to be 100 and does not need to be incremented by 1 even when the corresponding first marker is 1 (representing the appearance of the reflection object). Since the cumulative values corresponding to other indices (the $1^{st}$ to $4^{th}$ and the $10^{th}$ to $N^{th}$ indices) are 0, they remain unchanged and do not need to be decremented by 1 even when the corresponding first markers are 0 (representing that the reflection object does not appear). That is, the cumulative value corresponding to the $5^{th}$ index is changed from 1 to 0, the cumulative value corresponding to the $6^{th}$ index is changed from 30 to 29, the cumulative value corresponding to the $7^{th}$ index is changed from 60 to 61, the cumulative value corresponding to the $8^{th}$ index is changed from 99 to 100, the cumulative value corresponding to the $9^{th}$ index remains to be 100, and the cumulative values corresponding to other indices remain unchanged (i.e., remain to be 0).

Moreover, since the cumulative value corresponding to the $5^{th}$ index is changed from 1 to 0, the second marker corresponding to the $5^{th}$ index is re-set from "1" (i.e., the first value) to "0" (i.e., the second value). Since the cumulative value corresponding to the $8^{th}$ index is changed from 99 to 100, that is, incremented to K, the second marker corresponding to the $8^{th}$ index is changed from "1" to "0". The cumulative values corresponding to other indices remain unchanged.

obtained in a storage unit and increments the counter by 1 to cumulate the analyses times. Afterwards, the cumulative analyses times is checked to see if a predetermined value is reached (step S150). When the counter reaches a predetermined value, the microcontroller 10 generates the cumulative environment array using the stored real-time environment array (step S160), and use the generated cumulative environment array to compare with subsequently-generated real-time environment array. The storage unit and the counter may be embedded in the microcontroller 10 or may be provided externally.

Figure 9:
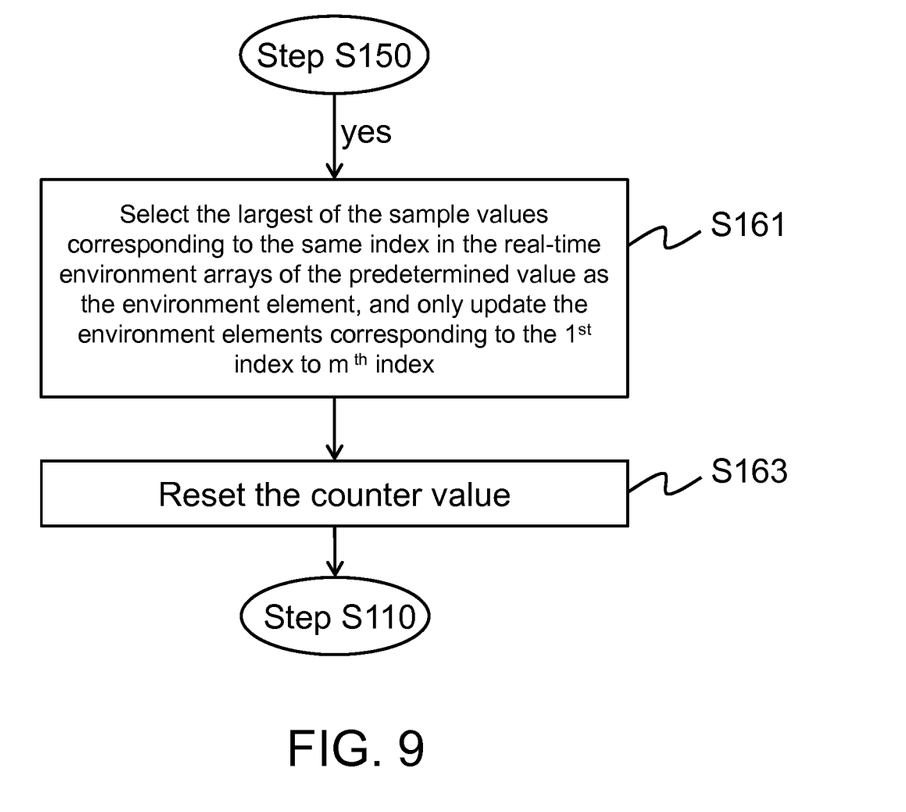
FIG. 9 is a flowchart of step S160 in an embodiment.

Please referring to FIG. 9, which set the predetermined value to be 50 as an example to describe step S160. When the microcontroller 10 obtains the $50^{th}$ real-time environment array, the counter value of the counter reaches 50. At this moment, the microcontroller 10 uses the largest of the sample values corresponding to the same index in the $1^{st}$ to $50^{th}$ real-time environment arrays as the environment element to obtain the cumulative environment array (step S161), and resets the counter value of the counter, that is, resets the cumulative analyses times to 0 (step S163). Afterwards, the 51th to $100^{th}$ real-time environment arrays obtained subsequently are compared with this cumulative environment array. Similarly, when the microcontroller 10

TABLE 2

|  | index | | | | | | | | | | |
| --- | --- | --- | --- | --- | --- | --- | --- | --- | --- | --- | --- |
|  | $1^{st}$ | $2^{nd}$ | $3^{rd}$ | $4^{th}$ | $5^{th}$ | $6^{th}$ | $7^{th}$ | $8^{th}$ | $9^{th}$ | ... | $(N-1)^{th}$ | $N^{th}$ |
| first marker | 0 | 0 | 0 | 0 | 0 | 0 | 1 | 1 | 1 | ... | 0 | 0 |
| cumulative value before update | 0 | 0 | 0 | 0 | 1 | 30 | 60 | 99 | 100 | ... | 0 | 0 |
| cumulative value after update | 0 | 0 | 0 | 0 | 0 | 29 | 61 | 100 | 100 | ... | 0 | 0 |
| second marker before update | 0 | 0 | 0 | 0 | 1 | 1 | 1 | 1 | 0 | ... | 0 | 0 |
| second marker after update | 0 | 0 | 0 | 0 | 0 | 1 | 1 | 0 | 0 | ... | 0 | 0 |

In some embodiments, in step S139, the second marker representing the moving of the reflection object is used to calculate the distance to the reflection object by checking the adjacent second marker corresponding to the minimum index value. Take Table 2 as an example, since the second markers corresponding to the $6^{th}$ index and the $7^{th}$ index are "1" (representing the moving of the reflection object), the second marker corresponding to the $6^{th}$ index is used to calculate the distance to the reflection object. Assuming that the sample time interval t is 1 ms, the second marker corresponding to the $6^{th}$ index amounts to the reflected sound wave received 6 ms after the start of sensing the reflecting sound wave. Therefore, the distance between the reflection object and the ultrasonic sensor (i.e., the distance to the user) is 1.029 meters, which is speed of sound (343 m/s)×receiving time (6 ms)/2.

In some embodiments, referring to FIG. 2, after obtaining the real-time environment array of each reflected signal, the microcontroller 10 stores the real-time environment array obtains the $100^{th}$ real-time environment array, the counter value of the counter reaches 50 again. At this moment, the microcontroller 10 updates the cumulative environment array using the $51^{th}$ to $100^{th}$ real-time environment arrays according to the method mentioned above, and resets the counter value of the counter.

Take Table 3 as an example, among the sample values corresponding to the $1^{st}$ index, the $3^{rd}$ sample value (3.06) in the real-time environment arrays is the largest. Therefore, the environment element corresponding to the $1^{st}$ index is updated to be 3.06.

Among the sample values corresponding to the $2^{nd}$ index, the $6^{th}$ sample value in the real-time environment array (3.13) is the largest. Therefore, the environment element corresponding to the $2^{nd}$ index is updated to be 3.13. Similarly, the environment elements corresponding to the $3^{rd}$ to $N^{th}$ indices are obtained, and a therefore a new set of cumulative environment array is obtained.

TABLE 3

| | | index | | | | | | | | |
|---|---|---|---|---|---|---|---|---|---|---|
| | | $1^{st}$ | $2^{nd}$ | $3^{rd}$ | $4^{th}$ | $5^{th}$ | $6^{th}$ | $7^{th}$ | ... $(N-1)^{th}$ | $N^{th}$ |
| 1 | sample value | 3.04 | 3.12 | 3.06 | 2.76 | 2.32 | 2.12 | 2.52 | ... 2.13 | 2.13 |
| 2 | sample value | 2.94 | 3.09 | 3.02 | 2.45 | 2.22 | 2.12 | 2.56 | ... 2.09 | 2.11 |
| 3 | sample value | 3.06 | 3.05 | 3.05 | 2.67 | 2.41 | 2.22 | 2.57 | ... 2.11 | 2.24 |
| 4 | sample value | 2.89 | 3.10 | 3.00 | 2.75 | 2.44 | 2.31 | 2.64 | ... 2.05 | 2.25 |
| 5 | sample value | 3.05 | 3.05 | 2.96 | 2.67 | 2.34 | 2.26 | 2.39 | ... 2.19 | 2.06 |
| 6 | sample value | 3.01 | 3.13 | 2.89 | 2.68 | 2.37 | 2.15 | 2.34 | ... 2.11 | 2.03 |
| ... | ... | ... | ... | ... | ... | ... | ... | ... | ... | ... |
| 47 | sample value | 2.89 | 3.07 | 2.99 | 2.59 | 2.29 | 2.29 | 2.64 | ... 2.17 | 2.19 |
| 48 | sample value | 3.02 | 3.06 | 3.10 | 2.71 | 2.36 | 2.21 | 2.21 | ... 2.15 | 2.21 |
| 49 | sample value | 2.87 | 3.01 | 3.06 | 2.72 | 2.39 | 2.28 | 2.62 | ... 2.09 | 2.12 |
| 50 | sample value | 2.78 | 2.99 | 3.09 | 2.64 | 2.43 | 2.23 | 2.61 | ... 2.22 | 2.24 |
| | environment element | 3.06 | 3.13 | 3.10 | 2.76 | 2.44 | 2.31 | 2.67 | ... 2.22 | 2.25 |

\* The units of the sample value and the environment element are volts (V).

Moreover, when updating the cumulative environment array, referring to FIG. 7, when the first marker corresponding to the m+1$^{th}$ index is marked to represent the appearance of the reflection object, only the environment elements corresponding to the 1$^{st}$ to the m$^{th}$ indices are updated (step S161). That is, only the environment elements corresponding to the indices before the index corresponding to the first marker representing the appearance of the reflection object are updated.

Take Table 4 as an example. In this example, m is 5. The first markers corresponding to the 1$^{st}$ to 5$^{th}$ indices are 0 (which represents that no new reflection object appears), and the first marker corresponding to the 6$^{th}$ index is 1 (which represents the appearance of a new reflection object). According to the method mentioned above (obtaining the largest sample value), only the environment elements corresponding to the 1$^{st}$ to 5$^{th}$ indices are updated. The environment elements corresponding to the 6$^{th}$ to Nth indices remain to be the original values (i.e., unchanged).

TABLE 4

| | | index | | | | | | | | |
|---|---|---|---|---|---|---|---|---|---|---|
| | | $1^{st}$ | $2^{nd}$ | $3^{rd}$ | $4^{th}$ | $5^{th}$ | $6^{th}$ | $7^{th}$ | ... $(N-1)^{th}$ | $N^{th}$ |
| | first marker | 0 | 0 | 0 | 0 | 0 | 1 | 1 | ... 0 | 0 |
| 51 | sample value | 3.04 | 3.12 | 3.06 | 2.76 | 2.32 | 2.12 | 2.52 | ... 2.13 | 2.13 |
| 52 | sample value | 2.94 | 3.09 | 3.02 | 2.45 | 2.22 | 2.12 | 2.56 | ... 2.09 | 2.11 |
| 53 | sample value | 3.06 | 3.05 | 3.05 | 2.67 | 2.41 | 2.22 | 2.57 | ... 2.11 | 2.24 |
| 54 | sample value | 2.89 | 3.10 | 3.00 | 2.75 | 2.44 | 2.31 | 2.64 | ... 2.05 | 2.25 |
| 55 | sample value | 3.05 | 3.05 | 2.96 | 2.67 | 2.34 | 2.26 | 2.39 | ... 2.19 | 2.06 |
| 56 | sample value | 3.01 | 3.13 | 2.89 | 2.68 | 2.37 | 2.15 | 2.34 | ... 2.11 | 2.03 |
| ... | ... | ... | ... | ... | ... | ... | ... | ... | ... | ... |
| 97 | sample value | 2.89 | 3.07 | 2.99 | 2.59 | 2.29 | 2.29 | 2.64 | ... 2.17 | 2.19 |
| 98 | sample value | 3.02 | 3.06 | 3.10 | 2.71 | 2.36 | 2.21 | 2.21 | ... 2.15 | 2.21 |
| 99 | sample value | 2.87 | 3.01 | 3.06 | 2.72 | 2.39 | 2.28 | 2.62 | ... 2.09 | 2.12 |
| 100 | sample value | 2.78 | 2.99 | 3.09 | 2.64 | 2.43 | 2.47 | 2.61 | ... 2.22 | 2.24 |
| | environment element before update | 3.01 | 3.09 | 3.12 | 2.77 | 2.50 | 2.31 | 2.29 | ... 2.21 | 2.23 |
| | environment element after update | 3.06 | 3.13 | 3.10 | 2.76 | 2.44 | 2.31 | 2.29 | ... 2.21 | 2.23 |

In practical applications, in the object detection method using ultrasonic waves and the object detection apparatus according to the embodiment of the invention, ultrasonic sensor 14 may be installed at the front or side surface of an electronic appliance to perform user detections. Using the object appearance array and the continuous appearance array, it can be clearly known if any user (reflection object) appears. Using the moving object array, it can be clearly known if the user is moving and the moving direction. The microcontroller 10 transmits the information of whether the user appears, whether the user is moving, the moving direction, and the distance to the user to the power management module 20 of the electronic appliance to enable the power management module to switch to corresponding power modes to achieve the objective of power saving.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An object detection method using ultrasonic waves for use in managing power modes of an electronic appliance, comprising:
    emitting a plurality of ultrasonic signals sequentially according to a time interval;
    sensing a sound wave formed by the ultrasonic signal reflected by a reflection object to generate a reflected signal; and
    analyzing the reflected signal to detect the at least one reflection object, the analyzing step of each reflected signal comprising:
    sampling the reflected signal to generate a plurality of sample values, and form a real-time environment array having the sample values, wherein the sample values correspond to a plurality of indices, respectively;
    comparing, according to the indices, the sample values in the real-time environment array with a plurality of environment elements in a cumulative environment array corresponding to the indices to generate an object appearance array, wherein each of the environment elements is one of the sample values in previous real-time environment arrays corresponding to the same index obtained in a plurality of previous analyzing steps, the object appearance array has a plurality of first markers corresponding to the indices, respectively, each of the first markers corresponds to a comparison result of the sample value and the environment element corresponding to the same index, wherein the comparing operation comprises:
        comparing each of the sample values with the environment element corresponding the same index; and
        generating the object appearance array according to the comparison results of the environment elements and the sample values, including:
            when the sample value is larger than the corresponding environment element, setting the corresponding first marker to be a first value representing detection of the reflection object; and
            when the sample value is smaller than the corresponding environment element, setting the corresponding first marker to be a second value representing that the reflection object is not detected;
    selectively cumulating a plurality of cumulative values corresponding to the indices in a continuous appearance array based on the first markers in the object appearance array according to the indices, wherein each of the cumulative values is larger than or equal to 0, and the cumulating operation comprises:
        when the first marker is marked to represent the detection of the reflection object, the corresponding cumulative value is incremented by 1; and
        when the first marker is marked to represent that the reflection object is not detected, the corresponding cumulative value is decremented by 1;
    updating a plurality of second markers in a moving object array corresponding to the indices to respond to the change of the cumulative values in the continuous appearance array according to the indices, wherein the updating operation comprises:
        when the cumulative value is incremented to 1, setting the corresponding second marker to be a first value for representing that the reflection object is moving;
        when the cumulative value is incremented to K, setting the corresponding second marker to be a second value for representing that the moving reflection object is no longer moving, wherein K is an integer larger than 1; and
        when the cumulative value in decremented to 0, setting the corresponding second marker to the second value for representing that the reflection object is not detected; and
    calculating a distance to the reflection object according to the speed of sound, a sample time interval and minimum index value of the indices corresponding to the second markers marked to represent that the reflection object is moving; and
    managing power modes of the electronic appliance based on the values in the object appearance array and the moving object array.

2. The object detection method using ultrasonic waves according to claim 1, wherein each of the environment elements is the largest of the sample values corresponding to the same index in the real-time environment arrays.

3. The object detection method using ultrasonic waves according to claim 1, wherein the comparing step further comprises:
    changing each first marker being the first value and not adjacent to the same value of the first markers to be the second value according to the sequence of the indices.

4. The object detection method using ultrasonic waves according to claim 1, wherein the analyzing step further comprises:
    when the analyses times of the analyzing step reaches a predetermined value, updating the cumulative environment array based on the real-time environment arrays obtained in previous analyzing steps, and updating the environment element corresponding to the first index to the $M^{th}$ index only among the indices, wherein the M +1 $^{th}$ index is the smallest of all the indices corresponding to the second markers representing the appearance of the reflection object, and m is a positive integer.

5. The object detection method using ultrasonic waves according to claim 1, wherein the sampling step comprises:
    dividing the reflected signal into a plurality of sample signals by another time interval; and
    quantifying the sample signals to obtain the sample values.

6. An object detection apparatus for use in managing power modes of an electronic appliance, comprising:

an ultrasonic transducer for emitting a plurality of ultrasonic signals sequentially according to a time interval and sensing a sound wave formed by the ultrasonic signal reflected by a reflection object to generate a reflected signal;
a driving circuit for driving the ultrasonic transducer; and
a microcontroller for analyzing the reflected signal to detect the at least one reflection object, the analyzing step of the reflected signal comprising:
sampling the reflected signal to generate a real-time environment array having a plurality of sample values, wherein the sample values correspond to a plurality of indices, respectively;
comparing the real-time environment array with a cumulative environment array to generate an object appearance array, wherein the cumulative environment array has a plurality of environment elements corresponding to the indices and corresponds to previous real-time environment arrays, the object appearance array has a plurality of first markers corresponding to the indices, and the comparing step comprises:
comparing each of the sample values with the environment element corresponding the same index; and
generating the object appearance array according to the comparison result of the environment elements and the sample values, including:
when the sample value is larger than the corresponding environment element, setting the corresponding first marker to be a first value representing detection of the reflection object; and
when the sample value is smaller than the corresponding environment element, setting the corresponding first marker to be a second value representing that the reflection object is not detected;
updating a continuous appearance array according to the object appearance array, wherein the continuous appearance array has a plurality of cumulative values, the cumulative values correspond to the indices, respectively, wherein each of the cumulative values is larger than or equal to 0, and the cumulating step comprises:
when the first marker is marked to represent the detection of the reflection object, the corresponding cumulative value is incremented by 1; and
when the first marker is marked to represent that the reflection object is not detected, the corresponding cumulative value is decremented by 1;
updating a moving object array according to the change of the continuous appearance array, wherein the moving object array has a plurality of second markers corresponding to the indices, respectively, and the updating step comprises:
when the cumulative value is incremented to 1, setting the corresponding second marker to be a first value for representing that the reflection object is moving;
when the cumulative value is incremented to K, setting the corresponding second marker to be a second value for representing that the moving reflection object is no longer moving, wherein K is an integer larger than 1; and
when the cumulative value in decremented to 0, setting the corresponding second marker to the second value for representing that the reflection object is not detected; and
calculating a distance to the reflection object according to the speed of sound, a sample time interval and minimum index value of the indices corresponding to the second markers marked to represent that the reflection object is moving; and
managing power modes of the electronic appliance based on the values in the object appearance array and the moving object array.

7. The object detection apparatus according to claim 6, further comprising:
a power management module for controlling power of an electronic appliance according to the detecting result of the microcontroller.

8. The object detection apparatus according to claim 6, wherein each of the environment elements is the largest of the sample values corresponding to the same index in the previous real-time environment arrays.

* * * * *